(12) United States Patent
Kang et al.

(10) Patent No.: US 9,627,681 B2
(45) Date of Patent: Apr. 18, 2017

(54) SILICON-BASED COMPOSITE AND PRODUCTION METHOD THEREOF

(71) Applicant: LG Chem, Ltd., Seoul (KR)

(72) Inventors: Yoon Ah Kang, Daejeon (KR); Yong Ju Lee, Daejeon (KR); Mi Rim Lee, Daejeon (KR); Je Young Kim, Daejeon (KR); Hye Ran Jung, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/221,651

(22) Filed: Mar. 21, 2014

(65) Prior Publication Data

US 2014/0205907 A1 Jul. 24, 2014

Related U.S. Application Data

(63) Continuation of application No. PCT/KR2013/009329, filed on Oct. 18, 2013.

(30) Foreign Application Priority Data

Nov. 30, 2012 (KR) .................. 10-2012-0138532

(51) Int. Cl.
*H01M 6/14* (2006.01)
*H01M 4/36* (2006.01)
*H01M 4/48* (2010.01)
*H01M 4/583* (2010.01)
*H01M 4/52* (2010.01)
*H01M 4/485* (2010.01)
*H01M 4/587* (2010.01)
*H01M 4/62* (2006.01)

(52) U.S. Cl.
CPC ............ *H01M 4/366* (2013.01); *H01M 4/48* (2013.01); *H01M 4/485* (2013.01); *H01M 4/52* (2013.01); *H01M 4/583* (2013.01); *H01M 4/587* (2013.01); *H01M 4/625* (2013.01); *Y02P 70/54* (2015.11)

(58) Field of Classification Search
CPC .......... H01M 4/04; H01M 4/366; H01M 4/48; H01M 4/52; H01M 4/583
See application file for complete search history.

(56) References Cited

U.S. PATENT DOCUMENTS

| | | |
|---|---|---|
| 5,395,711 A | 3/1995 | Tahara et al. |
| 2002/0164479 A1 | 11/2002 | Matsubara et al. |
| 2003/0118905 A1 | 6/2003 | Fukuoka et al. |
| 2005/0031958 A1 | 2/2005 | Fukuoka et al. |
| 2005/0084758 A1* | 4/2005 | Yamamoto ............ H01M 4/13 429/231.4 |
| 2006/0068287 A1 | 3/2006 | Morita et al. |
| 2007/0224508 A1 | 9/2007 | Aramata et al. |
| 2009/0202911 A1* | 8/2009 | Fukuoka ................ C23C 16/26 429/231.8 |
| 2011/0244333 A1 | 10/2011 | Kawada |
| 2011/0244334 A1* | 10/2011 | Kawada .................. C23C 16/26 429/231.8 |
| 2012/0006690 A1* | 1/2012 | Amendola ................ C25C 1/02 205/366 |
| 2012/0264020 A1* | 10/2012 | Burton ................... B82Y 30/00 429/231.8 |
| 2012/0295155 A1* | 11/2012 | Deng ...................... H01B 1/122 429/200 |
| 2015/0188127 A1 | 7/2015 | Niimi et al. |

FOREIGN PATENT DOCUMENTS

| | | |
|---|---|---|
| EP | 1363341 A2 | 11/2003 |
| EP | 2394956 A1 | 12/2011 |
| JP | H06325765 A | 11/1994 |
| JP | 2007059213 A | 3/2007 |
| JP | 2008282819 A | 11/2008 |
| JP | 2011-113862 A | 6/2011 |
| JP | 2011222151 A | 11/2011 |
| JP | 2014044899 A | 3/2014 |
| JP | 2014073942 A | 4/2014 |
| KR | 20090058505 A | 6/2009 |
| WO | 2012108113 A1 | 8/2012 |

OTHER PUBLICATIONS

Search report from European Application No. 13836204.1, dated Oct. 13, 2014.
Office Action from European Application No. 13 836 204.1, dated Sep. 30, 2015.

\* cited by examiner

*Primary Examiner* — Patrick Ryan
*Assistant Examiner* — Ben Lewis
(74) *Attorney, Agent, or Firm* — Lerner, David, Littenberg, Krumholz & Mentlik, LLP

(57) ABSTRACT

The present invention relates to a silicon-based composite including a silicon oxide which is coated thereon with carbon and bonded therein to lithium. The present invention also relates to a method of producing a silicon-based composite, comprising coating a surface of silicon oxide with carbon, mixing the silicon oxide coated with carbon with lithium oxide, and heat-treating a mixture of the silicon oxide coated with carbon and the lithium oxide in an inert atmosphere.

25 Claims, 2 Drawing Sheets

SILICON-BASED COMPOSITE AND PRODUCTION METHOD THEREOF

CROSS-REFERENCE TO RELATED APPLICATION

The present application is a continuation of International Application No. PCT/KR2013/009329 filed on Oct. 18, 2013, which claims priority to Korean Patent Application No. 10-2012-0138532 filed on Nov. 30, 2012 in the Republic of Korea, the disclosures of which are incorporated herein by reference.

TECHNICAL FIELD

The present invention relates to a silicon-based composite and a production method thereof.

BACKGROUND ART

Lithium secondary battery is an energy storage device storing therein energy produced while lithium ions move from an anode to a cathode in a discharge process and from a cathode to an anode in a charge process. Compared with other batteries, lithium secondary batteries have been used in various industries since they have a high energy density and a low self-discharge rate.

A lithium secondary battery may include a cathode, an anode, an electrolyte, and a separator, and the like. While in an initial lithium secondary battery, a lithium metal is used as an anode active material, as safety problem due to repetition of charge and discharge appears, the lithium metal is replaced with a carbon-based material such as graphite. Since the carbon-based anode active material has an electrochemical reaction potential with lithium ions that is similar to lithium metal, and has a crystal structure that is less changed in the course of continuous intercalation and deintercalation of lithium ions, it can continuously charge and discharge the battery to improve charge and discharge life cycle.

However, as market recently expands from a small-sized lithium secondary battery used in portable devices to a large-sized secondary battery used in automobiles, high capacity and high power techniques of an anode active material are required, and thus development for non-carbon-based anode active materials such as silicon, tin, germanium, zinc, and lead having a higher theoretical capacity than carbon-based anode materials is in progress.

Among such non-carbon-based anode active materials, since a silicon-based material has 11 times greater theoretical capacity (4190 mAh/g) than the theoretical capacity (372 mAh/g) of the carbon-based anode active material, it is in the limelight as a material for replacing the carbon-based anode active material. However, in the case where silicon is used alone, when lithium ions are intercalated, since the silicon expands three times or more in volume, there appears a tendency that the battery capacity decreases as charge and discharge are repeated, and safety decrease too.

In recent years, studies on a silicon-based composite in which the silicon-based material and a carbon-based material are used together are actively in progress so as to minimize the volume expansion of the silicon-based materials and thus obtain a high capacity and increase charge and discharge cycle.

The most basic method for synthesis of a composite is a method in which carbon is coated on a silicon-based material. It is known that the silicon-based composite obtained by such a method enhances electrical conductivity between active material particles, and electrochemical characteristics with respect to electrolyte, and decreases volume expansion of silicon-based particles to increase the battery life.

However, when the silicon-based composite is used as an anode active material, the initial efficiency of the secondary battery may be reduced due to the formation of non-reversible phase by the silicon-based material in the initial charge and discharge.

Therefore, it is necessary to develop a method of producing a novel silicon-based composite that can overcome all the above-described limitations.

DISCLOSURE OF THE INVENTION

Technical Problem

The present invention provides a silicon-based composite that can solve a reduction in initial efficiency of a battery due to the formation of non-reversible phase by a silicon-based material in the initial charge and discharge, and a method of producing the same.

The present invention also provides an anode active material including the silicon-based composite, and an anode for a secondary battery including the same.

Technical Solution

An embodiment of the present invention provides a silicon-based composite including a silicon oxide which is coated thereon with carbon and bonded therein to lithium.

An embodiment of the present invention also provides a method of producing a silicon-based composite, including coating a surface of silicon oxide with carbon, mixing the silicon oxide coated with carbon with lithium oxide, and heat-treating a mixture of the silicon oxide coated with carbon and the lithium oxide in an inert atmosphere.

Advantageous Effects

According to the present invention, a reaction between silicon oxide and lithium can be controlled by coating a surface of the silicon oxide with carbon and bonding lithium to the silicon oxide through a heat treatment, and by applying this to a secondary battery, the initial efficiency of the secondary battery can be increased.

MODE FOR CARRYING OUT THE INVENTION

Figure 1:
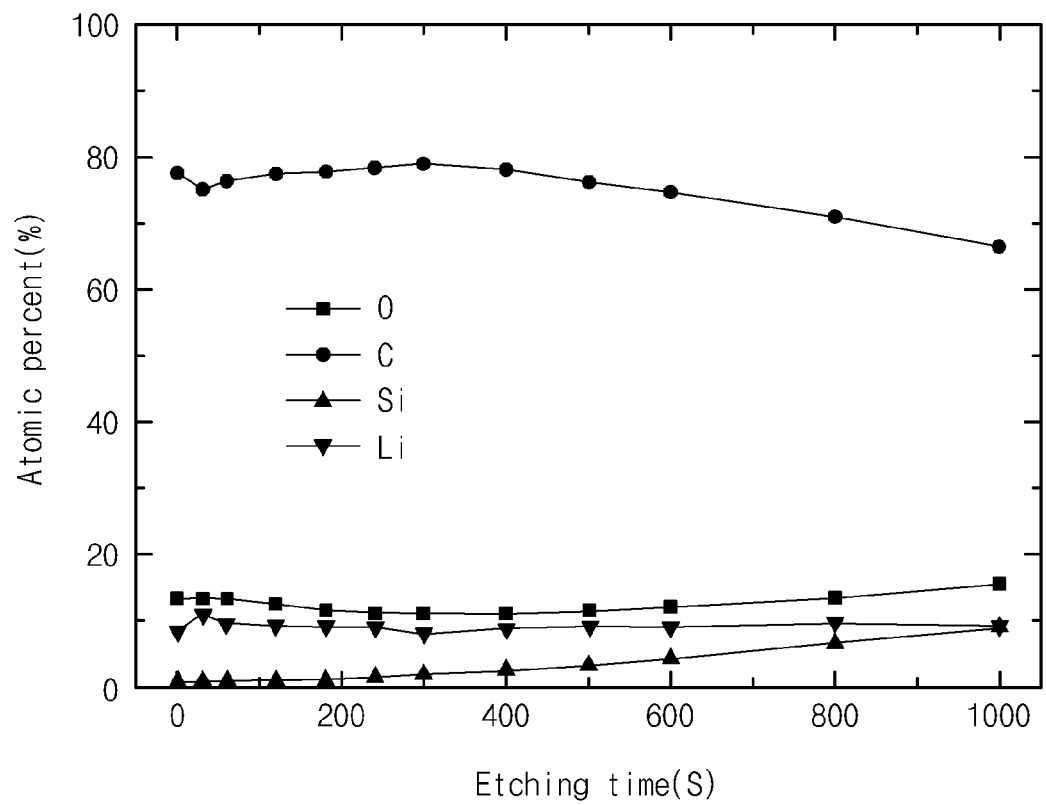
FIG. 1 is a graph showing a concentration gradient of elements versus etching time as it travels from a surface of a silicon-based composite to the sphere core thereof in accordance with an embodiment of the present invention.

The present invention provides a silicon-based composite including a silicon oxide which is coated thereon with carbon and is bonded therein to lithium, an anode active material, and an anode for a secondary battery.

Hereinafter, the present invention will be described in detail.

A silicon-based composite according to an exemplary embodiment can decrease a change in volume of silicon oxide due to intercalation and deintercalation of lithium in charge and discharge by coating a surface of the silicon oxide with carbon, then allowing the lithium and the silicon oxide coated with carbon to be bonded to each other through a heat treatment to form a compound. Also, as described above, since lithium and silicon oxide are bonded in advance to reduce a bonding with lithium ions emitting from a cathode in charge and discharge, the initial efficiency of a secondary battery can be increased.

In detail, in a silicon-based composite according to an exemplary embodiment, the carbon may be a crystalline carbon, an amorphous carbon, or a mixture thereof, and particularly a crystalline carbon. A representative example of the crystalline carbon-based compound may be graphite, and an example of the graphite-based crystalline carbon may be artificial graphite or natural graphite having good output characteristic and good rate characteristic. Also, the amorphous carbon-based compound is a material in which carbon atoms have an amorphous crystal structure, and may include, for example, soft carbon (low temperature calcined carbon) or hard carbon, mesophase pitch carbide, calcined coke, etc.

The amount of carbon may be in a range of 2 parts by weight to 30 parts by weight based on 100 parts by weight of silicon oxide. When the amount of carbon is less than 2 parts by weight, carbon may not be uniformly coated on a surface of silicon oxide particle, and when the amount of carbon exceeds 30 parts by weight, the capacity of the secondary battery decreases and resistance increases due an excessive coating of carbon, so that the performance of the secondary battery may be lowered. Also, the coating thickness of carbon may be about 5 nm in average.

Also, the silicon-based composite according to an embodiment of the present invention may include at least one lithium oxide selected from the group consisting of $Li_2O$, $Li_2CO_3$ and $LiOH.H_2O$.

Also, the amount of lithium in the silicon-based composite may be in a range of 2 parts by weight to 15 parts by weight based on 100 parts by weight of the silicon oxide coated with carbon. When the amount of lithium is less than 2 pats by weight, the initial efficiency may not be improved, and when the amount of lithium exceeds 15 parts by weight, unwanted lithium silicate may be formed due to excessive lithium.

Also, in a silicon-based composite according to an embodiment of the present invention, the silicon oxide prior to being bonded to the lithium may be $SiO_x$ (0<x<2), particularly $SiO_x$ (0<x≤1), and more particularly silicon monoxide (SiO).

In the silicon-based composite according to an embodiment of the present invention, the silicon oxide bonded to lithium may be produced not by a limited specific method but by various methods well known in the art.

Also, the silicon-based composite obtained from silicon oxide bonded to lithium in an embodiment of the present invention exists in the form of Li silicate, and in detail, may include at least one selected from the group consisting of $Li_4SiO_4$, $Li_2SiO_3$, and $Li_2Si_2O_5$.

Meanwhile, the centripetal direction of the silicon-based composite in the present invention indicates a direction directed toward the center of the silicon-based composite in a direction perpendicular from a tangent line (surface) of the silicon-based composite in a section of the silicon-based composite. At this time, since lithium silicate is uniformly created in the silicon-based composite, the silicon-based composite is characterized in that there is no difference in concentration gradient of lithium along the centripetal direction. When the silicon-based composite is etched in the centripetal direction from the surface thereof, the concentration gradients of elements according to etching time are shown in FIG. 1.

If silicon oxide that is not coated with carbon is heat-treated with lithium, since the production of a compound due to a bonding between lithium and silicon oxide is not controlled, metal crystal phases of lithium and silicon are abruptly grown inside the silicon oxide. When such a silicon-based composite is used as an anode active material of a secondary battery, an enhancement effect in the initial efficiency of the secondary battery is almost not generated. On the other hand, in the present invention, the surface of silicon oxide is first coated with carbon, and then a silicon composite which is obtained by reacting the silicon oxide coated with carbon with lithium is used as an anode active material. At this time, since the carbon coating layer exists between lithium and silicon oxide to function as a diffusion barrier layer, the bonding between lithium and silicon oxide is slowly formed, and thus a compound including lithium and silicon oxide may be formed by a desired amount in a stable structure inside the silicon-based composite. Therefore, by forming Li silicate which is formed in an initial charge and discharge in advance, the charged amount is equal but the initial irreversibility in discharge is decreased, thus capable of obtaining superior initial charge and discharge efficiency.

Also, an embodiment of the present invention provides a method of producing a silicon-based composite, including:

coating a surface of a silicon oxide with carbon; and mixing the silicon oxide coated with carbon and lithium oxide to obtain a mixture and heat-treating the mixture in an inert atmosphere.

Hereinafter, the producing method of the present invention will be described in detail.

First, in the producing method of a silicon-based composite according to an embodiment of the present invention, the coating of the surface of silicon oxide with carbon may be performed by supplying acetylene gas and then performing a heat treatment at a temperature range of 600° C. to 900° C. However, the coating is not necessarily limited thereto. In the coating, in addition to acetylene gas, carbon-containing gases such as methane, ethane, propane, ethylene, and the like may be used.

Thereafter, the lithium oxide mixed with the silicon oxide coated with carbon may include at least one selected from the group consisting of $Li_2O$, $Li_2CO_3$ and $LiOH.H_2O$.

At this time, the mixing is not particularly limited if a process that may uniformly mix the silicon oxide coated with carbon and the lithium oxide is used, and a milling apparatus applying a mechanical force may be used for the mixing.

Also, in the producing method of a silicon-based composite according to an embodiment of the present invention, the heat-treating in the inert atmosphere may be performed by heating the mixture in an inert atmosphere using a gas such as Ar, $N_2$ or the like from a room temperature to 500-1000° C. at a temperature rising rate of 1-20° C./min.

When the heat treatment temperature is less than 500° C., a sufficient amount of Li silicate may not be produced inside the silicon-based composite, and when the temperature exceeds 1000° C., silicon crystal grains may be increased due to the high temperature. Also, when the temperature rising rate is less than 1° C./min, a long time is taken for the heat treatment and thus may be disadvantageous in view of cost, and when the temperature rising rate exceeds 20°

C./min, lithium in the lithium oxide rapidly bonds to the silicon oxide and thus wanted Li silicate may not be produced.

The producing method of a silicon-based composite may further include, after the heat treating, performing a cooling to room temperature.

Also, the present invention provides a secondary battery including a cathode containing a cathode active material, a separator, an anode containing an anode active material, and an electrolyte, wherein the anode active material comprises the silicon-based composite.

In the secondary battery according to an embodiment of the present invention, since the anode active material includes the anode active material containing the silicon-based composite, the initial efficiency of the secondary battery can be enhanced.

The anode is, for example, produced by coating and drying a mixture of an anode active material, a conductive material and a binder on an anode collector, and if necessary, a filler may be further added. The cathode may be produced by coating and drying a cathode active material on a cathode collector.

The separator is disposed between the anode and the cathode, and may be an insulative thin film having a high ion permeability and mechanical strength. Meanwhile, since the collector, the cathode active material, the conductive material, the binder, the filler, the separator, the electrolyte, lithium salt, and the like are well known in the art, detailed description thereof will be omitted.

An electrode assembly is formed by disposing the separator between the cathode and the anode, is wound or folded, and put in a cylindrical battery case or polygonal battery case, and an electrolyte is injected, thereby completing a secondary battery. In another method, the electrode assembly is stacked in a bi-cell structure and is impregnated in an electrolyte, and the resultant structure is put in a pouch and sealed to complete a secondary battery.

Modes for Carrying Out the Invention

Hereinafter, the present invention will be described in detail with reference to embodiments. The embodiments may be, however, modified into various forms, and the scope of the present invention is not limited to only the embodiments described below.

EXAMPLES

Example 1

Production of Silicon-based Composite Coating of Silicon Monoxide (SiO) with Carbon (1)

20 g of silicon monoxide as silicon oxide was put in a rotary tube furnace, argon gas was flown at a rate of 0.5 L/min., and the temperature was elevated to 1000° C. at a rate of 5° C./min. While the rotary tube furnace was rotated at a rate of 10 rpm/min, argon gas and acetylene gas were flown at rates of 1.8 L/min and 0.3 L/min, respectively, and a heat treatment was performed at 800° C. for 3 hours to produce silicon monoxide coated with carbon. At that time, the amount of carbon was 5 parts by weight based on the silicon monoxide.

Mixing of Silicon Monoxide Coated with Carbon and Lithium Oxide (2)

The amount of $Li_2O$ was adjusted such that the amount of lithium was 7 parts by weight based on the silicon monoxide coated with carbon, and the silicon monoxide and $Li_2O$ powder were uniformly mixed using a mortar. Since $Li_2O$ powder exhibits white color, when the silicon monoxide and $Li_2O$ powder were uniformly mixed, the mixture powder exhibited gray overall, The mixed powder was transferred to an alumina crucible, the alumina crucible was loaded in a furnace and heated at a rate of 10° C./min from room temperature to 900° C. while Ar gas was supplied at a flow rate of 100 cc/min, the furnace was maintained at 900° C. for 5 hours, and then cooled at a rate of 10° C./min to produce a silicon composite.

Comparative Example 1

Silicon monoxide and lithium oxide were mixed and heat-treated in the same manner as Example 1 except that the coating (1) of a surface of the silicon monoxide with carbon was not performed, thereby producing a silicon-based composite in which lithium is bonded to silicon monoxide.

Comparative Example 2

Carbon was coated on a surface of silicon monoxide in the same manner as Example 1 except that the mixing (2) of silicon monoxide and lithium oxide was not performed, thereby producing a silicon monoxide-based composite coated with carbon.

Example 2

Production of Secondary Battery

The silicon-based composite produced in Example 1 as an anode active material, an acetylene black as a conductive material, polyvinylidenefluoride as a binder were mixed at a weight ratio of 85:5:10, and then the mixture thus obtained was mixed with N-methyl-2-pyrrolidone that is a solvent, to produce a slurry. The produced slurry was coated on a surface of a copper collector to a thickness of 65 μm, dried and rolled, and then punched to produce an anode.

10 wt % of fluoro ethylene carbonate (FEC) was added to an anhydrous electrolyte solvent which was produced by mixing ethylene carbonate and diethylcarbonate at a volume rate of 30:70 to produce 1M LiPF6 anhydrous electrolyte.

A lithium metal foil was used as a counter electrode, a polyolefin separator was disposed between both electrodes, and then the electrolyte was injected to produce a coin type secondary battery.

Comparative Example 3

A coin type secondary battery was produced in the same manner as Example 2 except that the silicon-based composite of Comparative Example 1 was used instead of the silicon-based composite of Example 1.

Comparative Example 4

A coin type secondary battery was produced in the same manner as Example 2 except that the silicon-based composite of Comparative Example 2 was used instead of the silicon-based composite of Example 1.

Experimental Example 1

Initial Efficiency Analysis

To investigate initial efficiencies of the respective secondary batteries produced in Example 2 and Comparative Examples 3 and 4, a first cycle charge capacity and a first cycle discharge capacity were measured, and the ratio (initial efficiency) of the first cycle discharge capacity to the first cycle charge capacity is shown in Table 1.

TABLE 1

|  | Raw material | Initial efficiency |
| --- | --- | --- |
| Example 2 | SiO/C + Li$_2$O | 86.03 |
| Comparative Example 3 | SiO + Li$_2$O | 64.46 |
| Comparative Example 4 | SiO/C | 74.50 |

Figure 2:
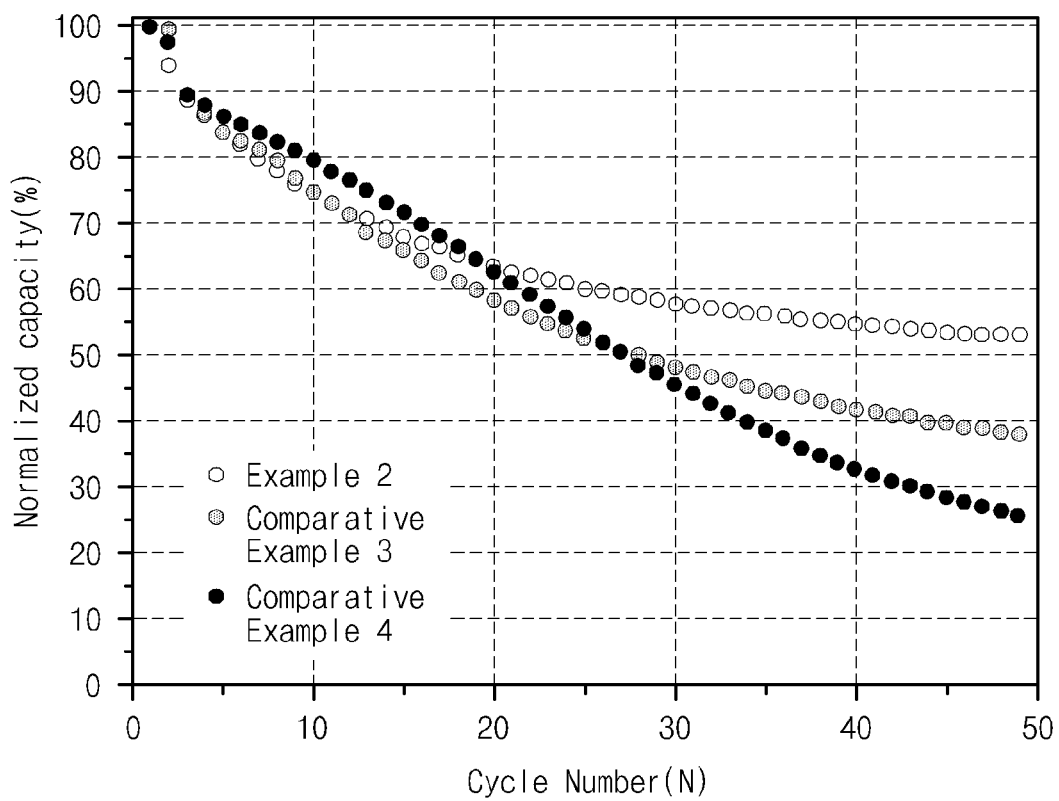
FIG. 2 is a graph showing initial efficiency analysis results of secondary batteries in accordance with an experimental example of the present invention.

As shown in Table 1, it can be known that the secondary battery (Example 2) including the silicon-based composite according to an embodiment of the present invention has the initial efficiency of about 86%, which is higher by about 20% than that in Comparative Example 3 in which carbon was not coated. Also, compared to Comparative Example 4 in which lithium was not mixed, it can be known that the initial efficiency of Example 2 is higher by about 12%. Thus, it can be known that the initial efficiency of the secondary battery including the silicon-based composite of the present invention rises (see FIG. 2).

The invention claimed is:

1. A silicon-based composite consisting of silicon oxide which is coated thereon with carbon and is bonded therein to lithium,
   wherein the lithium is derived from at least one kind of a lithium compound selected from the group consisting of Li$_2$O, Li$_2$CO$_3$ and LiOH.H$_2$O,
   wherein the lithium in the silicon-based composite has a uniform concentration from a surface of the silicon-based composite to a center of the silicon-based composite.

2. The silicon-based composite of claim 1, wherein the carbon is a crystalline carbon, an amorphous carbon, or a mixture thereof.

3. The silicon-based composite of claim 1, wherein the amount of the carbon is in a range of 2 part by weight to 30 part by weight based on 100 parts by weight of the silicon oxide.

4. The silicon-based composite of claim 1, wherein the amount of the lithium is in a range of 2 part by weight to 15 part by weight based on 100 parts by weight of the silicon oxide coated with carbon.

5. The silicon-based composite of claim 1, wherein the silicon oxide is SiO$_x$ (0<x<2).

6. The silicon-based composite of claim 5, wherein the silicon oxide is silicon monoxide.

7. A method of producing the silicon-based composite of claim 1, comprising:
   coating a surface of silicon oxide with carbon;
   mixing the silicon oxide coated with carbon and a lithium compound to obtain a mixture; and
   heat-treating the mixture in an inert atmosphere,
   wherein the lithium compound comprises at least one selected from the group consisting of Li$_2$O, Li$_2$CO$_3$ and LiOH.H$_2$O.

8. The method of claim 7, wherein the coating with carbon is performed by supplying acetylene gas and performing a heat treatment at 800° C.

9. The method of claim 7, wherein the amount of the carbon is in a range of 2 part by weight to 30 part by weight based on 100 parts by weight of the silicon oxide.

10. The method of claim 7, wherein the heat-treating is performed by heating the mixture from a room temperature to 500-1000° C. at a temperature rising rate of 1-20° C./min.

11. The method of claim 7, after the heat-treating, further comprising cooling the mixture to room temperature.

12. A secondary battery comprising:
   a cathode comprising a cathode active material;
   a separator;
   an anode comprising an anode active material; and
   an electrolyte,
   wherein the anode active material comprises the silicon-based composite of claim 1.

13. A silicon-based composite comprising silicon oxide which is coated thereon with carbon and is bonded therein to lithium,
   wherein the lithium is derived from at least one kind of a lithium compound selected from the group consisting of Li$_2$O, and LiOH.H$_2$O,
   wherein the lithium in the silicon-based composite has a uniform concentration from a surface of the silicon-based composite to a center of the silicon-based composite.

14. The silicon-based composite of claim 13, wherein the carbon is a crystalline carbon, an amorphous carbon, or a mixture thereof.

15. The silicon-based composite of claim 13, wherein the amount of the carbon is in a range of 2 part by weight to 30 part by weight based on 100 parts by weight of the silicon oxide.

16. The silicon-based composite of claim 13, wherein the amount of the lithium is in a range of 2 part by weight to 15 part by weight based on 100 parts by weight of the silicon oxide coated with carbon.

17. The silicon-based composite of claim 13, wherein the silicon oxide is SiO$_x$ (0<x<2).

18. The silicon-based composite of claim 17, wherein the silicon oxide is silicon monoxide.

19. The silicon-based composite of claim 13, wherein the silicon oxide bonded to the lithium comprises at least one selected from the group consisting of Li$_4$SiO$_4$, Li$_2$SiO$_3$ and Li$_2$Si$_2$O$_5$.

20. A method of producing the silicon-based composite of claim 13, comprising:
   coating a surface of silicon oxide with carbon;
   mixing the silicon oxide coated with carbon and a lithium compound to obtain a mixture; and
   heat-treating the mixture in an inert atmosphere,
   wherein the lithium compound comprises at least one selected from the group consisting of Li$_2$O, and LiOH.H$_2$O.

21. The method of claim 20, wherein the coating with carbon is performed by supplying acetylene gas and performing a heat treatment at 800° C.

22. The method of claim 20, wherein the amount of the carbon is in a range of 2 part by weight to 30 part by weight based on 100 parts by weight of the silicon oxide.

23. The method of claim 20, wherein the heat-treating is performed by heating the mixture from a room temperature to 500-1000° C. at a temperature rising rate of 1-20° C./min.

24. The method of claim 20, after the heat-treating, further comprising cooling the mixture to room temperature.

25. A secondary battery comprising:
   a cathode comprising a cathode active material;
   a separator;
   an anode comprising an anode active material; and
   an electrolyte, wherein the anode active material comprises the silicon-based composite of claim 13.

\* \* \* \* \*